UNITED STATES PATENT OFFICE.

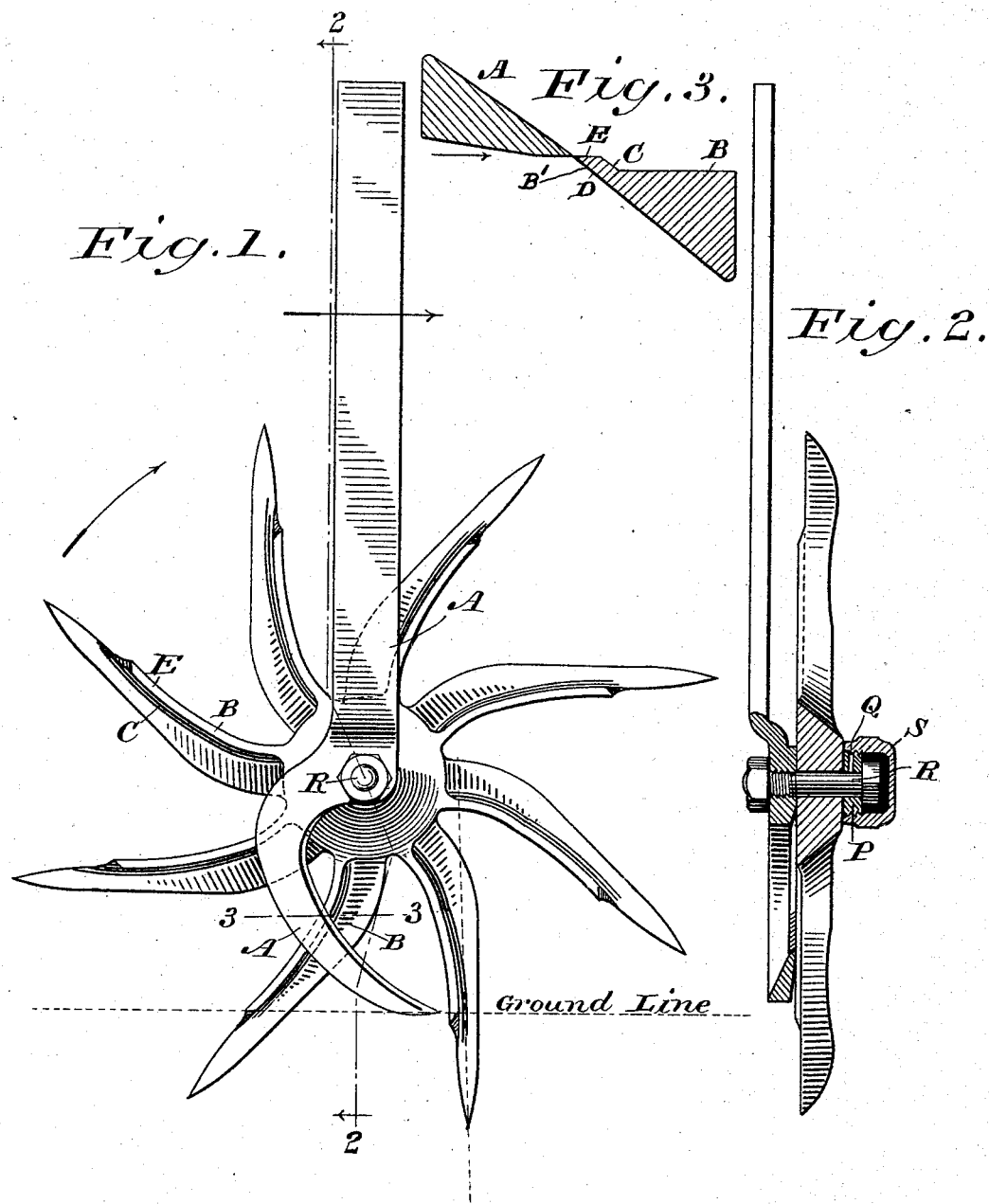

CHARLES W. McCORMICK, OF EMPORIA, KANSAS.

ATTACHMENT FOR PLOWS.

SPECIFICATION forming part of Letters Patent No. 388,428, dated August 28, 1888.

Application filed June 20, 1888. Serial No 277,629. (No model.)

*To all whom it may concern:*

Be it known that I, CHARLES W. McCOR-MICK, of Emporia, in the county of Lyon and State of Kansas, have invented certain new and useful Improvements in Attachments for Plows, of which the following is a specification, reference being had to the accompanying drawings, in which—

Figure 1 is a side elevation; Fig. 2, a vertical section on the line 2 2 of Fig. 1; Fig. 3, a cross-section on the line 3 3 of Fig. 1.

My invention consists in certain improvements upon colter attachments of the kind patented to me July 7, 1885, No. 321,906.

The object of this class of devices is to have the trash—such as weeds, cornstalks, straw, &c.—divided and cut off by the combined action of each individual spoke or arm of the walking wheel and the cutter. These parts are generally arranged so as to give a shear cut, and thus each bundle or portion of the trash is individually gathered up and sheared off. In order to secure this action, it is desirable that the points or ends of the arms which enter the ground shall have broad front faces, so that after they penetrate the ground there shall be a broad bearing against the earth sufficient to continue their movement and to get a forcible pressure sufficient for shearing of the bundles against the cutting-edge of the colter. That principle has been well understood heretofore; but in all walking wheels for this purpose applied to colters, so far as I am aware, there has been one defect in the operation, due to a defect in construction—that is to say, the points of the arms descending to enter the ground have either been formed of lines radial to the walking wheel, or else have been turned out of such radial lines in the wrong direction, so that when they come down to enter the ground they do not strike the earth truly end foremost, like a stick being driven; but, on the contrary, they strike the earth as an oar strikes the water, more or less upon one side. They therefore break the earth and encounter undue resistance in settling to their places, and after they have penetrated to place the earth, having been disturbed, does not exert so strong a pressure, tending to continue the revolution of the arms, as it ought to and would do if the arms penetrated the earth more nearly in a straight line in the direction of their length, as a stake does. Besides this, where the ends of the arms, descending to penetrate the earth, strike the earth and penetrate it too much sidewise, like an oar acting on the water, the resistance of the earth to penetration is so increased that the rotary motion of the wheel is apt to be retarded, and the arm which should penetrate directely into the earth is apt to be slid forward, so that it does not properly divide the trash or properly enter the earth. Thus the wheel is often caused to drag a little and not to divide the trash to be cut truly, and not to continue a constant and regular rotary movement. The cornstalks and other trash are often distributed unequally on the ground, and sometimes a pile of trash is struck by the pointed arm about to enter the earth, which results not only in serious disturbance of the rotary movement of the walking wheel, but causes the arm to slide forward and take up too much of the trash, and sometimes tends to lift the plow out of the ground and chokes the operation of the cutting devices.

One object of my improved construction is to overcome these defects. I therefore form the pointed ends of the arms of the walking wheel, which are to enter the ground not upon radial lines proceeding from the center of the wheel, but upon lines as shown in Fig. 1, so that the pitch or direction of the points shall be such as to approach the ground and enter it longitudinally, with as little disturbance, except that of mere compression of the earth, as practicable. I make my walking wheels with arms of different lengths, adapted to different kinds of ground. For example, in hard clay land the points do not need to be so long or enter the ground so far as in soft sandy ground; but in all cases the points should have a direction such that a line running with their length will not strike the axis of the wheel, but will run forward of it more or less, depending somewhat upon the diameter of the wheel, and somewhat, also, upon the length of the points or the depth necessary for them to penetrate the ground. In practice I have found that two different sizes of wheels, varying in diameter about two inches, are sufficient for all cases, and that the best results come from having the line corresponding with the direction of the penetrating-points run from about two to four inches forward of the axis of the wheel. The difference in the diameter of the wheels mentioned should always be caused by the differences in the lengths of the penetrating-points, the wheels in other respects being uniform in dimensions. By throwing the points forward, or giving them such a line of direction as above described, they will assume the perpendicular position in the ground at the time the point of the colter begins to shear, as shown in Fig. 1. This is important, because the greatest resistance to the revolution of the wheel is when the colter begins its shear cut with one of the arms, because the pressure of the act of cutting against the arm in opposition to the direction of its rotation is then lowest down, and therefore greatest to resist rotation of the arm. The earth-penetrating point then being substantially perpendicular, as shown in Fig. 1, the work of the cutting is accomplished to the best advantage.

With a wheel constructed in the manner described I have found in practice that the rotation of it is uniform; that it divides the trash into substantially equal parcels, and that it measures the ground truly and operates uniformly with success.

Another feature of my invention consists in the form which I give to each one of the shear-blades of the arms of the walking wheel. It is necessary in manufacturing such a walking wheel that the surfaces of the curved shear-blades which are adjacent to the curved colter-blade shall be all on the same parallel plane. That has heretofore been accomplished by the use of a lathe to turn off these surfaces while the walking wheel is caused to rotate. That method is practicable, but expensive. It is desirable, therefore, to provide for the use of a cheaper method of truing all the said surfaces of the walking wheel. I therefore form my arms in cross-section, so that while they have sufficient body to give them the requisite strength, they yet have only a thin part or ledge with sides in parallel planes projecting forward to be ground, as shown in the sectional view, Fig. 3. In this figure A indicates the colter; B, the main body of the arm; B', the shear part, which has parallel sides C and D, and forms a sort of ledge projecting forward to form the shearing part of the arm. E indicates the ground surface, which is always of the same width, no matter what may be the depth of grinding into the ledge required, and the ground surface upon every ledge of every arm will be the same in dimensions. With such thin surfaces to be ground to a common plane, it is practicable to use an emery-wheel, which will do the work rapidly and satisfactorily; but where the whole body of the arm has had to be ground, or where its shape was such that the grinding was liable to reach the back part of the arm, it has been found impracticable to use an emery-wheel, and lathes have had to be employed to make the shearing-planes of the arms of the wheel parallel; but with my improved construction less grinding is required, and it can be done more speedily and with entire perfection by the use of an emery-wheel.

Another practical advantage of my improved form of shear-arm is that the surfaces of the arms to come in contact with the colter-blade are reduced to the minimum, so that there is the minimum of frictional resistance in the operation of the machine. The cutting-edges can therefore be brought more perfectly opposite each other and the surfaces of contact be made to press more firmly together, so as to insure the best results with the minimum of friction practicable in such a machine.

In this class of devices the axles are peculiarly liable to become muddy or gritty and the operation of the walking wheel choked and resisted by foreign matter entering an opening for lubrication. Besides this, rapid wear is caused by foreign matter. Where a hole is stopped with a pin in any usual way, the cornstalks and trash are likely to loosen or break it off or otherwise force in dust or grit; hence I have found it necessary to adopt some more perfect means of retaining the lubricating-oil and of protecting the axle.

Referring to the drawings, P indicates a hub; Q, a radial opening through the hub leading to the fixed shaft R of the walking wheel. The hub is screw-threaded, as shown, and an internally-screw-threaded cap, S, fits over it. By removing the cap the oil can be poured in the opening in the hub to lubricate the shaft, and then the cap can be screwed on to place, which will keep the oil in and exclude all entrance of dirt, mud, &c.

Having described my improvements, what I claim to be new, and desire to secure by Letters Patent of the United States, is—

1. In a plow attachment, the combination, with a colter having a shear-blade, of a walking wheel provided with earth-penetrating points arranged on lines forward of the axis of the wheel, so as to penetrate the earth substantially in a direct line, as set forth.

2. A walking wheel for a plow attachment, having its arms provided with a ledge or shear part, B, having parallel sides, substantially as set forth.

In testimony of all which I have hereunto subscribed my name.

CHARLES W. McCORMICK.

Witnesses:
 MARCUS S. HOPKINS,
 C. P. ELWELL.